United States Patent [19]

Karlsson

[11] 4,123,620

[45] Oct. 31, 1978

[54] APPARATUS FOR CONTROLLING THE SOUND GENERATION IN THE LOUDSPEAKERS OF INTERCOMMUNICATING TELEPHONE SETS IN RESPONSE TO SPEECH SIGNALS FROM THE MICROPHONES OF SAID TELEPHONE SETS

[76] Inventor: Lars P. Karlsson, Masvägen 13, 183 51 Täby, Sweden

[21] Appl. No.: 802,803

[22] Filed: Jun. 2, 1977

[30] Foreign Application Priority Data

Jun. 8, 1976 [SE] Sweden .............................. 7606399

[51] Int. Cl.² .......................................... H04M 9/10
[52] U.S. Cl. ................................ 179/1 CN; 179/1 H
[58] Field of Search ............... 179/1 CN, 1 H, 1 HF, 179/1 VC

[56] References Cited

U.S. PATENT DOCUMENTS

| 3,849,603 | 11/1974 | Proios | 179/1 H |
| 3,958,084 | 5/1976 | Nicholas | 179/1 CN |
| 4,024,345 | 1/1976 | Kochem | 179/1 H |

OTHER PUBLICATIONS

A. Assimus, et al., "Digital Conference Network etc." IBM Tech. Discl. Bull., pp. 2967-2969, Mar. 1975.

*Primary Examiner*—Thomas W. Brown
*Assistant Examiner*—E. S. Kemeny
*Attorney, Agent, or Firm*—Fleit & Jacobson

[57] ABSTRACT

An apparatus for controlling the generation of sound in the loudspeakers of intercommunicating telephone sets in response to pulse-code modulated speech signals from the microphones of the telephone sets. A digital comparator compares speech signals received from each microphone and delivers a binary control signal to a dividing circuit through which the speech signal having the highest maximum value passes. The dividing circuit responds to the control signal by dividing the speech signal by a desired factor. A loudspeaker, contained in the same telephone set as the microphone from which the speech signal having the highest maximum value emanated, is in circuit with a control unit. The same binary control signal causes the control unit to suppress the generation of sound in the loudspeaker.

4 Claims, 3 Drawing Figures

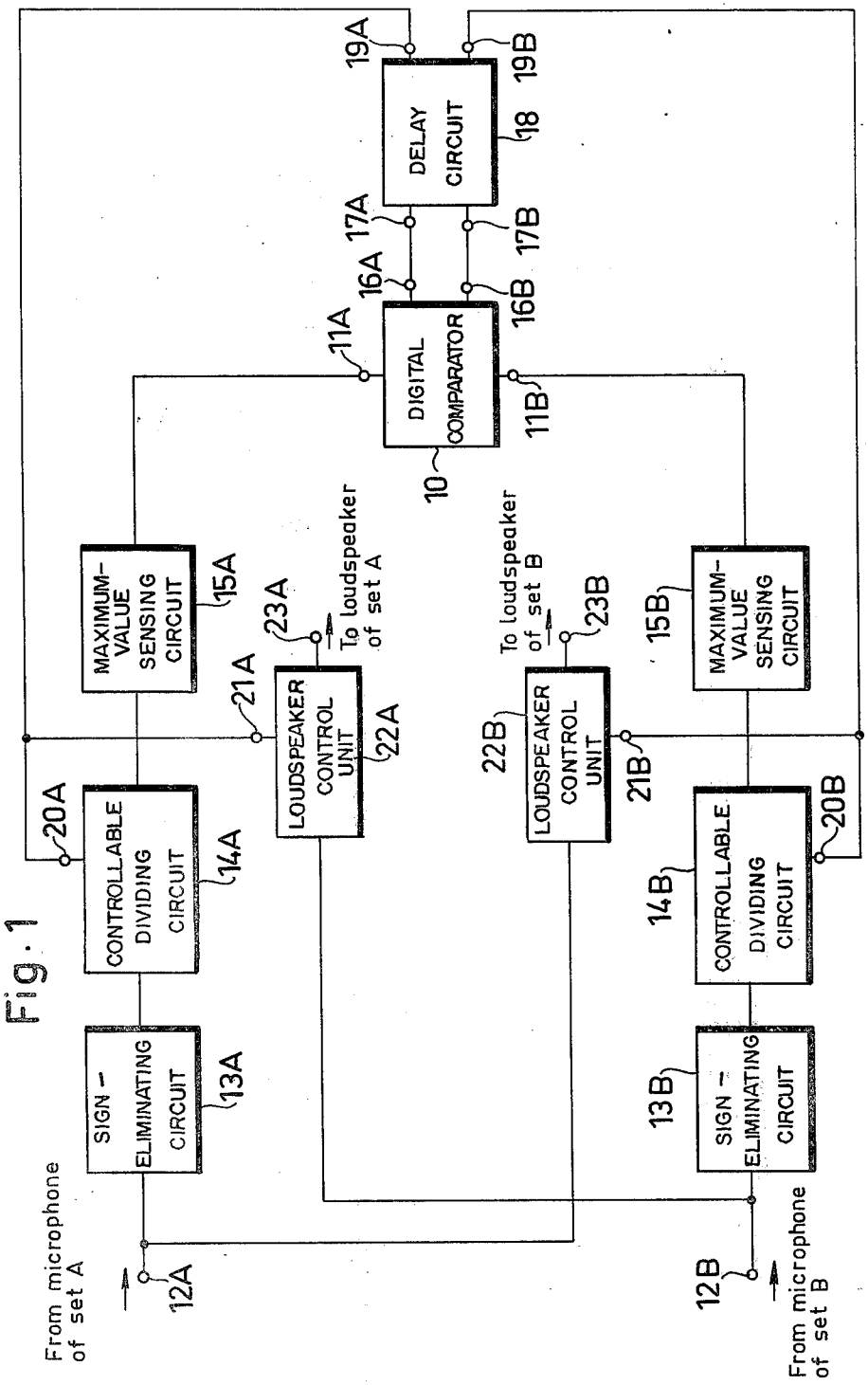

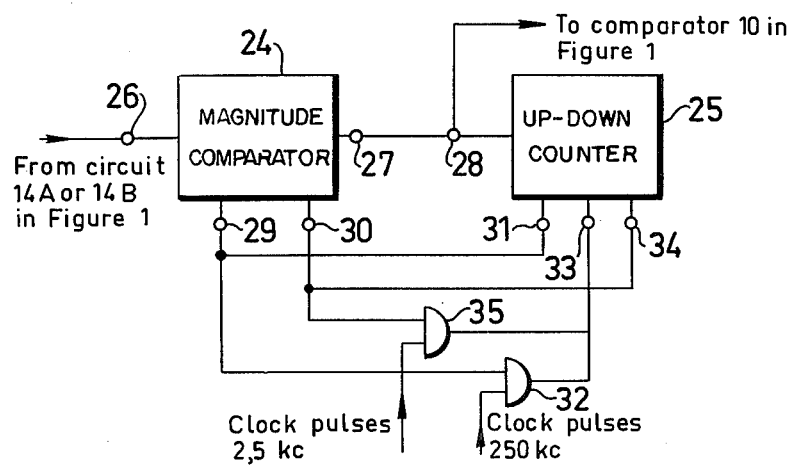
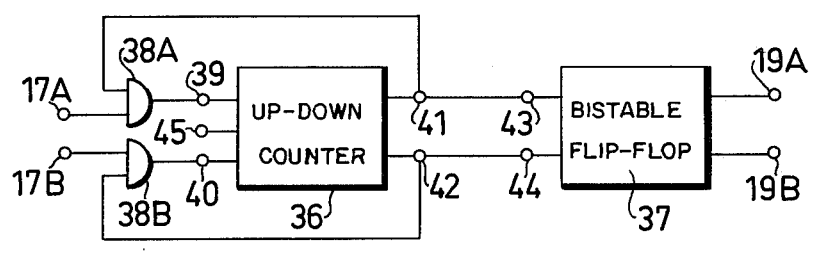

APPARATUS FOR CONTROLLING THE SOUND GENERATION IN THE LOUDSPEAKERS OF INTERCOMMUNICATING TELEPHONE SETS IN RESPONSE TO SPEECH SIGNALS FROM THE MICROPHONES OF SAID TELEPHONE SETS

The present invention relates to an apparatus for use in a telephone system having loudspeaking telephone sets, to control the sound generation in the loudspeakers of intercommunicating telephone sets in response to speech signals from the microphones of said telephone sets. Such an apparatus may be referred to as a speech controlled switching apparatus.

The purpose of the invention is to provide an apparatus of the kind above described, which can be manufactured at low costs and has a very reliable function and which is insensitive to normal variations in the supply voltage of the apparatus and in the temperature of the surrounding.

According to the invention there is provided an apparatus of the kind initially specified, characterized in that it comprises a digital comparator having at least two inputs, which are adapted to receive the speech signals in pulse-code modulated form each from one telephone set via a controllable dividing circuit and a maximum-value sensing circuit having a certain storage function, and a number of corresponding outputs, over which the comparator is adapted to deliver binary control signals to the dividing circuits to control said circuits and to control units for the loudspeakers of the telephone sets, the comparator being arranged to compare the received speech signals with each other and to deliver control signals being such as to cause the dividing circuit, connected to the input of the comparator on which the speech signal having the highest maximum value occurs, to divide the signal passing therethrough with a lower factor than the remaining dividing circuits, and to cause the control unit of the loudspeaker of the telephone set, from which said speech signal emanates, to suppress the sound generation in the loudspeaker of said telephone set.

It should be noted that the fact that the inputs of the comparator are adapted to receive the speech signals in pulse-code modulated form does not mean that the speech signals have to be transmitted in pulse-code modulated form between various intercommunicating telephone sets. Instead, if desired, the speech signals transmitted between intercommunicating telephone sets may consist of other digital signals or of analog signals. In such a case, the apparatus only has to be provided with the required additional means for causing a pulse-code modulation of the speech signals fed to the comparator.

A delay circuit may be connected between the comparator and the dividing circuits. In a preferred embodiment, each maximum-value sensing circuit comprises a clock-pulse controlled UP-DOWN counter which serves as a storage means and is adapted to count in an ascending order when the speech signal received by said circuit represents a number exceeding the prevailing setting of the counter, and to count in a descending order when said speech signal represents a lower number than the prevailing setting of the counter. The counter may suitably be caused to count in an ascending order at a considerably faster rate than it is caused to count in a descending order.

Below the invention will be described in further detail, reference being had, by way of example, to the accompanying drawings, in which:

FIG. 1 is a block diagram showing a speech control switching apparatus according to one embodiment of the invention;

FIG. 2 is a circuit diagram, showing a maximum-value sensing circuit incorporated in the apparatus of FIG. 1; and FIG. 3 is a circuit diagram showing a delay circuit incorporated in the apparatus of FIG. 1.

The apparatus shown in FIG. 1 comprises a digital comparator 10 having two inputs 11A and 11B, which are connected each to one of the two main inputs 12A and 12B, respectively, of the apparatus, via a sign-eliminating circuit 13A and 13B, respectively, a controllable dividing circuit 14A and 14B, respectively, and a maximum-value sensing circuit 15A and 15B, respectively. The comparator 10 has two outputs 16A and 16B, respectively, which are connected each to one input 17A and 17B, respectively, of a delay circuit 18, having two outputs 19A and 19B, which are connected each to a control input 20A and 20B, respectively, of one of the two dividing circuits 14A and 14B, respectively, and to a control input 21A and 21B, respectively, of one loudspeaker control unit 22A and 22B, respectively. Each control unit 22A and 22B is connected in an interconnection line between one of the main inputs 12A and 12B and the corresponding main output 23A and 23B, respectively.

The apparatus shown in FIG. 1 forms a speech controlled switching apparatus, which is intended to control the sound generation in the loudspeakers of two intercommunicating telephone sets in such a manner as to avoid that the acoustic feedback occurring between the loudspeaker and the microphone of each set may cause any interference in the desired communication between the two sets. If the two telephone sets are designated A and B, respectively, the microphone of telephone set A could be assumed to be connected to main input 12A of the illustrated apparatus, while the microphone of telephone set B is connected to the other main input 12B. Furthermore, the loudspeaker of telephone set A could be assumed to be connected to main output 23A, while the loudspeaker of telephone set B is connected to main output 23B. Naturally, any required circuits for providing amplification, analog-to-digital conversion or digital-to-analog conversion of the speech signals may be provided between each microphone and the corresponding main input as well as between each loudspeaker and the corresponding main output of the illustrated apparatus.

The manner of operation of the apparatus according to FIG. 1 will now be explained in greater detail. It may then be assumed that speech signals from the microphone of telephone set A are supplied in pulse-code modulated form to main input 12A, while corresponding signals from the microphone of telephone set B are supplied to main input 12B. By way of example, it may further be assumed that each one of said signals consists of a sign bit and eight binary digit bits. The eight binary digit bits represent a pulse-code modulated portion of one of said speech signals. The sign bit of each signal is eliminated in the corresponding sign-eliminating circuit 13A or 13B, respectively, which may consist for instance of a multiplexor. Hereby the output signals from circuits 13A and 13B will contain only the eight digit bits of the respective input signals. Each dividing circuit 14A and 14B, which for instance may consist of either a multiplexor, a shift register or a subtracting circuit, is arranged to divide the incoming pulse-code modulated signal with a factor determined by the control signal appearing on control input 20A ro 20B, respectively. Said factor may suitably be shifted between the values 1 and 8 in response to the control signal received. This means that, in the first case, the output signal from circuit 14A or 14B, respectively, will be identical to the incoming signal, while in the second case, the output signal will be shifted three places to the right.

The maximum-value sensing circuits 15A and 15B serve to sense the peak values of the output signals from the dividing circuits 14A and 14B, respectively, and to provide a certain storing of said values. The structure and funcation of circuits 15A and 15B will be explained in further detail in connection with the subsequent description of FIG. 2.

At its inputs 11A and 11B, comparator 10 receives the output signals from the maximum-value sensing circuits 15A and 15B. The comparator compares the two incoming signals with each other and generates at its outputs 16A and 16B binary logic signals indicating which one of the two incoming signals is the largest one. For instance, the comparator 10 may be adapted to deliver a signal corresponding to a logical "1" over output 16A and a signal corresponding to a logical "0" over output 16B, if the digital signal received on input 11A represents a number larger than the number represented by the signal received on input 11B. Similarly, the output signal delivered over output 16A may correspond to a logical "0" and the output signal on output 16B may correspond to a logical "1" when the signal received on input 11B is larger than the signal received on input 11A. The output signals from comparator 10 are fed each to one input 17A and 17B, respectively, of delay circuit 18, which serves to prevent switching operations in the apparatus in response to any peaks of short duration in the speech signals from any of the connected telephone sets. The structure and function of delay circuit 18 will be explained in further detail in connection with the subsequent description of FIG. 3.

The output signals appearing on the output 19A and 19B of delay circuit 18 will thus consist of delayed signals corresponding to the logic signals applied on inputs 17A and 17B. If desired, the signals on the outputs may be inverted in relation to the signals on the inputs. However, if this is not the case, a logical "1" occuring on input 17A will after the time delay caused by delay circuit 18 cause a logical "1" on output 19A, while a logical "0" on input 17B will generate a logical "0" on output 19B. If, as assumed above, a logical "1" on output 16A from comparator 10 and a logical "0" on output 16B indicates that the digital signal from the microphone of telephone set A is higher than the signal simultaneously delivered from the microphone of telephone set B, each dividing circuit 14A and 14B, respectively, should be adapted to shift from a state in which it provides a division with a factor 1 to a state in which it provides a division with a factor 8 when the control signal supplied from delay circuit 18 is shifted from a logical "1" to a logical "0". Similarly, each circuit 14A and 14B, respectively, should shift from a state in which it provides a division with a factor 8 to a state in which it provides a division with a factor 1 when the control signal is shifted from a logical "0" to a logical "1". Furthermore, each loudspeaker control unit 22A and 22B, respectively, should be adapted to suppress the sound generation in the loudspeaker of the respective telephone set when the control signal supplied from delay circuit 18 is a logical "1", while it should cause said suppression to cease when the control signal is shifted from a logical "1" to a logical "0".

In the illustrated embodiment, the loudspeaker control units 22A and 22B may function as switches. However, they may also be of any other suitable type.

FIG. 2 illustrates, by way of example, one possible design of each one of the two maximum-value sensing circuits 15A and 15B. The illustrated circuit comprises a magnitude comparator 24 and an UP-DOWN counter 25. The comparator 24 has two inputs 26 and 27, of which input 26 is intended to be supplied with the output signal from the appurtenant dividing circuit 14A or 14B in FIG. 1, while input 27 is connected to the output 28 of counter 25 which also forms the main output of the illustrated circuit. The comparator 24 has two outputs 29 and 30, one of which serves to deliver binary logic output signals indicating which one of the input signals has the highest magnitude. For instance, comparator 24 may generate an output signal corresponding to a logical "1" on output 29 and an output signal corresponding to a logical "0" on output 30 when the input signal on input 29 is higher than the input signal on input 27. Inversely, a logical "0" may occur on output 29 and a logical "1" on output 30, when the signal on input 27 is higher than the signal on input 26.

The output 29 of comparator 24 is connected, on the one hand to an UP input 31 of counter 25, and on the other hand to one input of a first AND gate 32, the other input of which is adapted to be supplied with clock pulses having a frequency of, for instance, 250 kilocycles per second. The output of AND gate 32 is connected to a clock-pulse input 33 of counter 25. The output 30 of comparator 24 is connected, on the one hand to a DOWN input 34 of counter 25, and on the other hand, to one input of a second AND gate 35, the other input of which is adapted to be supplied with clock pulses having a considerably lower frequency than the firstmentioned clock pulses, for instance 2.5 kilocycles per second. Similarly to the output of gate 32, the output of gate 35 is connected to the clock-pulse input 33 of counter 25.

The manner of operation of the maximum-value sensing circuit shown in FIG. 2 will now be explained. When the signal appearing on the output 29 of comparator 24 is a logical "1", gate 32 will be maintained in an open condition and permit clock pulses having the higher frequency of 250 kilocycles per second to pass therethrough. Since the signal from the comparator output 29 is supplied also to the UP input of counter 25, the counter will count in an ascending order until it reaches a setting corresponding to the number represented by the signal fed to comparator input 26. When, later on, the signal on input 26 is reduced, the output signals from the comparator will be shifted so that a logical "1" will occur on output 30. This will open gate 35 and cause the clock-pulse input of counter 25 to be supplied with clock pulses having the lower frequency of 2.5 kilocycles per second, meaning that the counter will count in a descending order, as the DOWN input is now actuated by the signal supplied from comparator output 30.

As a consequence of the different clock pulse frequencies the counter will count in an ascending order at a considerably faster rate than it counts in a descending order. This results in that the maximum-value sensing circuit will provide a certain storage function eliminating the risk of rapid short-duration switching operations in the apparatus.

FIG. 3 illustrates, by way of example, one possible design of the delay circuit 18, incorporated in the apparatus of FIG. 1. The circuit shown in FIG. 3 comprises a four bits UP-DOWN counter 36 and a bistable flip-flop 37. The two inputs 17A and 17B of said circuit correspond to those shown in FIG. 1. Similarly, the two outputs 19A and 19B correspond to the same outputs in FIG. 1. Each input 17A and 17B is connected to one input of an appurtenant AND gate 38A and 38B, respectively. The output of AND gate 38A is connected to an UP input 39 of counter 36, while the output of AND gate 38B is connected to a DOWN input 40 of counter 36. The counter 36 has two outputs 41 and 42, of which output 41 is connected to the other input of AND gate 38A, while output 42 is connected to the other input of AND gate 38B. Furthermore, the outputs of counter 36 are connected each to one input 43 and 44, respectively, of flip-flop 37. The counter 36 additionally has a clock-pulse input 45 which is adapted to be supplied with clock pulses having a frequency of, for instance, 6 kilocycles per second.

The manner of operation of the delay circuit shown in FIG. 3 will now be explained. It may be assumed that the counter 36 is adapted to deliver a signal corresponding to a logical "0" over output 41 when the counter reaches its highest value, i.e. the number 15. For all other settings, the counter will deliver a signal corresponding to a logical "1" over output 41. In corresponding manner, the counter 36 may be assumed to deliver a signal corresponding to a logical "0" over output 42, when the counter reaches its lowest setting, i.e. 0, while it is assumed to deliver a signal corresponding to a logical "1" over said output for all other settings of the counter. Assuming that the counter is set on the value 0 and that a logical "1" is received on input 17A, a corresponding signal. i.e. a logical "1", will be applied on the UP input 39 of counter 36. The 16 clock pulses next to follow will then cause the counter to count 16 steps in an ascending direction until it reaches setting value 15, when the output signal on output 41 of the counter will shift from a logical "1" to a logical "0". This causes the input signal on UP input 39 to shift from a logical "1" to a logical "0", whereby the counter is stopped in the position reached. Then, the setting of the counter cannot be changed until a signal corresponding to a logical "1" is received on input 17B. When such a signal is received on input 17B, a corresponding signal is also received on the DOWN input 40 of the counter, whereby the sixteen clock pulses next to follow will cause the counter to count sixteen steps in a descending order until it reaches setting value 0, when the output signal of output 42 will shift from a logical "1" to a logical "0". This will cause the input signal on the DOWN input 40 of the counter to shift from a logical "1" to a logical "0" which, in turn, stops the counter at the value reached.

It may be assumed that flip-flop 37 will shift from delivering a signal corresponding to a logical "0" on output 19A and a signal corresponding to a logical "1" on output 19B to delivering a logical "1" on output 19A and a logical "0" on output 19B, when the signal on input 43 is shifted from a logical "1" to a logical "0". In corresponding manner, it may be assumed that flip-flop 37 shifts from delivering a logical "1" on output 19A and a logical "0" on output 19B to delivering a logical "0" on output 19A and a logical "1" on output 19B, when the signal on input 44 is shifted from a logical "1" to a logical "0".

Over the two outputs 19A and 19B, the delay circuit above described will deliver output signals corresponding to the incoming signals on inputs 17A and 17B but delayed in time by an amount corresponding to 16 clock pulses. If the clock pulse frequency is 6 kilocycles per second, the time delay will amount to approximately 2.5 milliseconds.

The invention is not restricted to the embodiment above described, which may be modified in various manners within the scope of the invention. For instance, the dividing circuits may be arranged to provide a division with a factor other than the mentioned factors 1 and 8. Furthermore, the maximum-value sensing circuits 15A and 15B and the delay circuit 18 may be constructed in a manner entirely different from the one illustrated in FIGS. 2 and 3, respectively.

Finally, it should be noted that the invention is not restricted to applications where it is desired to provide speechcontrolled switching operations between only two intercommunicating telephone sets. Instead, the invention may be utilized also in connection with telephone systems permitting simultaneous communication between three or more different telephone sets.

I claim:

1. For use in a telephone system having a plurality of telephone sets, each telephone set including a microphone and a loudspeaker, an apparatus for controlling the generation of sound in the loudspeakers of intercommunicating telephone sets in response to pulse-code modulated speech signals from the microphones of said telephone sets comprising:

a plurality of controllable dividing circuits;

a plurality of maximum value sensing circuits, each sensing circuit including a storage function;

a plurality of control units, each one of said control units in series with a particular one of said loudspeakers; and a digital comparator having a plurality of inputs, each input for receiving a speech signal in pulse-code modulated form from one of said microphones via one of said controllable dividing circuits in series with one of said maximum-value sensing circuits, said digital comparator having a number of outputs, from which the comparator delivers binary control signals to the dividing circuits to control said dividing circuits and to the control units to control said control units, said comparator being arranged to compare the received speech signals with each other and to deliver a binary control signal to the dividing circuit through which the speech signal having the highest maximum value passes, said dividing circuit responding by dividing the speech signal passing therethrough with a lower factor than the remaining dividing circuits, said binary control signal further causing the control unit, associated with the loudspeaker of the telephone set having the microphone from which said maximum value speech signal emanates, to suppress the generation of sound in that loudspeaker.

2. An apparatus according to claim 1, further comprising a delay circuit connected between the comparator outputs and the dividing circuits.

3. An apparatus according to claim 1, wherein each maximum-value sensing circuit comprises a clock-pulse controlled UP-DOWN counter, which serves as a storage means and is adapted to count in an ascending order when the speech signal amplitude received by said circuit represents a number exceeding the prevailing setting of the counter, and to count in a descending order when said speech signal amplitude represents a lower number than the prevailing setting of the counter.

4. An apparatus according to claim 3, further comprising clock means for causing said counter to count in an ascending order to a considerably faster rate than it is caused to count in a descending order.

* * * * *